United States Patent

[11] 3,566,765

| [72] | Inventor | Motoi Nagashima<br>Tokyo-to, Japan |
|---|---|---|
| [21] | Appl. No. | 755,665 |
| [22] | Filed | Aug. 27, 1968 |
| [45] | Patented | Mar. 2, 1971 |
| [73] | Assignee | Shima Kogaku Kabushiki Kaisha<br>Tokyo-To, Japan |
| [32] | Priority | Dec. 31, 1967 |
| [33] | | Japan |
| [31] | | 43/200 |

[54] A DEVICE FOR CONTINUOUSLY ALTERING THE FOCAL LENGTH OF PHOTOGRAPHIC LENSES
1 Claim, 3 Drawing Figs.

| [52] | U.S. Cl. | 95/45 |
|---|---|---|
| [51] | Int. Cl. | G02b 7/10 |
| [50] | Field of Search | 95/44, 45; 350/187 |

[56] References Cited
UNITED STATES PATENTS

| 3,059,533 | 10/1962 | Mellberg | 95/45X |
|---|---|---|---|
| 3,351,411 | 11/1967 | Chapman | 350/187 |

*Primary Examiner*—John M. Horan
*Attorney*—Otto John Munz

ABSTRACT: A device for continuously altering the focal length of photographic lenses, which is detachably mounted between the camera body and the objective lens unit containing a diaphragm means and which comprises an operating ring means capable of continuously altering the focal length of the objective lens system or, in other words, the magnification of the objective lens system by a mere rotation of said operating ring means causing said objective lens unit to be driven forwardly or backwardly in the direction of the optical axis of said objective lens system and a built-in diaphragm actuating rod means capable of making telescopic movement in accordance with the forward or backward movement of said objective lens unit, whereby effecting the automatic operation of the diaphragm means in interlocking relation with the operation of the shutter button which is provided on the camera body, regardless of whichever focal length adjusting position occupied by said operating ring means.

Patented March 2, 1971 3,566,765

INVENTOR
MOTOI NAGASHIMA

BY *Otto John Munz*

ATTORNEY

Patented March 2, 1971

INVENTOR
MOTOI NAGASHIMA

BY Otto John Munz.
ATTORNEY

A DEVICE FOR CONTINUOUSLY ALTERING THE FOCAL LENGTH OF PHOTOGRAPHIC LENSES

BACKGROUND OF THE INVENTION

*1. Field of the invention*

The present invention is concerned with a device which is detachably mounted between the objective lens unit of a photographic camera and the camera body, and more particularly, it is related to a device which is capable of continuously altering the focal length of the objective lens system and which comprises a diaphragm actuating rod means capable of telescopically moving in accordance with the changes in said focal length.

*2. Description of the prior art*

In general, as the method for altering the focal length or the magnification of the objective lens system of photographic cameras, zoom lens system or conversion lens system is known. A zoom lens system, above all, is comprised of a multitude of lenses which are arranged in complicated manner, and as a natural result, the size of the entire zoom lens system has inevitably been large, which, in turn, has led to the relatively high price of such system. Known conversion lens system, on the other hand, had the drawbacks such that it was not capable of continuously altering the focal length or the magnification of the objective lens system and also that its user was compelled to carry along with him some different conversion lenses and to use, for each selection of a different magnification in taking photographs, one of these conversion lenses in exchange with the conversion lens which has been mounted till then on the cameras.

SUMMARY OF THE INVENTION

It is, therefore, an object of the present invention to provide a device for use in photographic cameras, which, by only a single unit, is capable of continuously altering the focal length of the photographic lens.

Another object of the present invention is to provide a device for photographic lenses, which has a built-in diaphragm actuating rod means which is capable of automatically operating the diaphragm means contained within the objective lens unit in interlocking relation with the operation of the shutter button which is provided on the body of the camera.

Other objects and attendant advantages of the present invention will become apparent by reading the following description in conjunction with the accompanying drawings.

DESCRIPTION OF THE PREFERRED EMBODIMENTS

Figure 1:
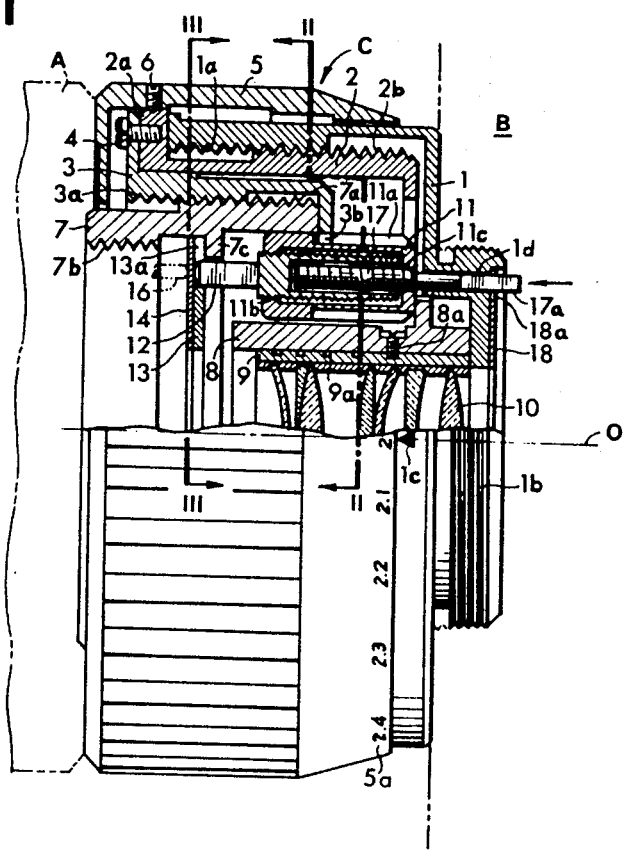
FIG. 1 is a side elevation, on an enlarged scale and partly in longitudinal section, of the device of the present invention.
Figure 2:
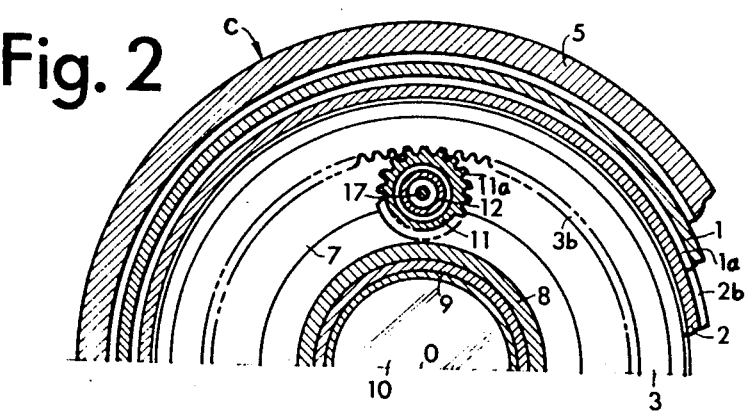
FIG. 2 is a fragmental sectional view taken along the line II–II in FIG. 1.
Figure 3:
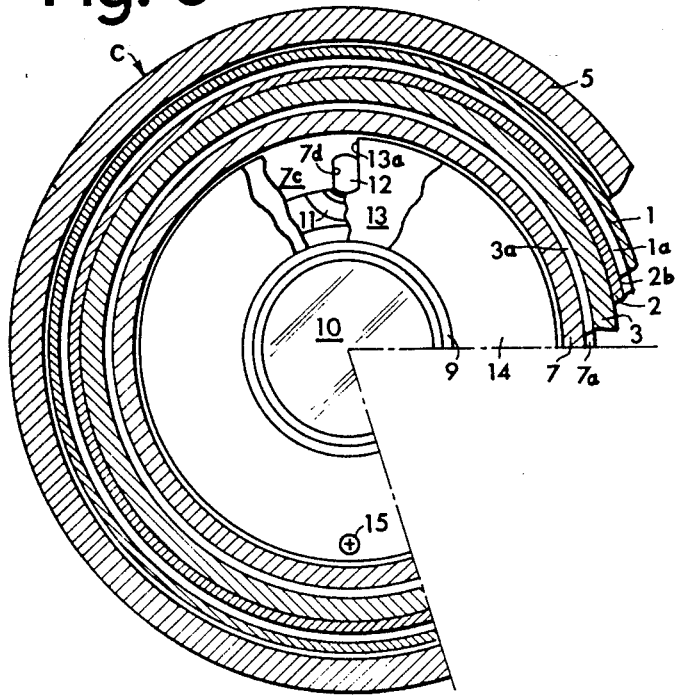
FIG. 3 is a fragmental sectional view taken along the line III–III in FIG. 1.

In FIGS. 1, 2 and 3, there is shown a device which is suitable for use with a photographic lens of the type that the diaphragm means (not shown) which is built within the standard objective lens unit generally indicated by the letter A is operated by an operating rod means which is adapted to move in the direction of the arrow indicated in FIG. 1 and along the optical axis O of the lens in interlocking relation with the downward depression of the shutter button (not shown) which is provided on the body B of the camera. The device which is generally indicated by the letter C is detachably attached to the camera body generally indicated at B by a mount portion 1b which is provided at the rear section of a cylindrical casing 1 having a threaded portion 1a which is formed on the inner circumferential face of said cylindrical casing 1. In said cylindrical casing 1 is contained a cylinder 2 having a flange 2a which is adapted to be brought into contact with the forward end face of said casing and also having a threaded portion 2b which is screwed into said threaded portion 1a of said casing 1. Inside the cylinder 2, in turn, there is inserted an intermediate cylinder 3 having an inner circumferential face on which is formed a threaded portion 3a and also having a rear end portion which is provided with an internal gear 3b. Said cylinder 2 is integrally coupled by means of a screw 4 to said intermediate cylinder 3. On the external side of the cylindrical casing 1 is mounted an operating ring 5 which is provided with magnification indicating graduations 5a which are arranged so as to face the fixed indicator 1c provided on the casing 1. Said operating ring 5 is integrally coupled by means of a screw 6 to cylinder 2. Inside the intermediate cylinder 3, there is inserted a cylinder 7 having a threaded portion 7a which is screwed into said threaded portion 3a and also having a mount portion 7b for attaching the objective lens unit A and a flange 7c which has the formation of a square-cornered notch 7d (see FIG. 3). This cylinder 7 is arranged so as to be limited of its movement in such a way that it is allowed to move in the direction of the optical axis by means of a guide bar (not shown) which is fixed to the cylindrical casing 1 but is unable to rotate concentrically with the optical axis O. A cylinder 8 is disposed in said casing 1 in concentric relation with the optical axis O, and is coupled by an appropriate coupling member (not shown) to the cylinder 2 so as to be rotated integrally with the latter. SAid cylinder 8 has, in the form of being slidably fitted therein, a cylinder 9 which is provided with a spiral groove 9a on its outer circumferential face and which supports a group 10 of auxiliary lenses. In said spiral groove 9a is fitted the tip of a screw 8a which is threaded into the cylinder 8. Also, the cylinder 9 is limited of its movement in such a way that it is only allowed to slide, by means of a member not shown, in the direction of the optical axis but is unable to rotate about the optical axis 0. Accordingly, as the cylinder 8 is rotated, said cylinder 9 will be caused to move either forwardly or backwardly along the optical axis 0 owing to the engagement of said screw 8a with said spiral groove 9a. In the space which is formed by the cylinder 7 and the cylinder 8, there is interposed a gear cylinder 11 having a toothed portion 11a which is adapted to mesh with the internal gear 3b and also having threaded holes 11b and 11c in the central portion of the end wall of said cylinder 11. In the threaded hole 11b is threadably fitted a threaded tube 12 which is loosely inserted in the interior of the gear cylinder 11 and which has a forward end portion provided with a square-cornered cross section. This threaded tube 12 has its forward end portion which is inserted through the square-cornered notch 7d formed in a flange 7c of the cylinder 7 and also through a square-cornered notch 13a of a ring 13 which is attached to the flange 7c. As a result, said threaded tube 12 itself is allowed to move in the direction of the optical axis 0, but is not adapted to rotate (see FIG. 3). In the foreground of said ring 13, there is disposed a pressure ring 14 made of a resilient material and this pressure ring 14 is attached by a screw 15 (see FIG. 3) to the flange 7c of the cylinder 7. This pressure ring 14 is adapted to always urge the foremost end of the threaded tube 12 in the counter arrow direction which is shown in FIG. 1. The operating lever 16 of the diaphragm means which is contained in the objective lens unit A is arranged in such a way that when said objective lens unit A has been mounted on the cylinder 7, said operating lever 16 is brought into contact with the fore-face of the pressure ring 14 in the position in which the operating lever 16 is substantially in register with the threaded tube 12. On the other hand, in the threaded hole 11c of the gear cylinder 11 is screwed a threaded rod 17 which, in turn, is loosely inserted in the interior portion of the threaded tube 12. The rear end portion 17a of said threaded rod 17 has a square-cornered cross section so as to be inserted through a hole 1d which is formed in the casing 1 and also through a square-cornered notch 18a formed in a holding ring 18 which is attached to the rear end of the casing 1. As a result, said threaded rod 17 itself is allowed to move in the direction of the optical axis but is not adapted to rotate. The spiral of the threaded portion 2b and the threaded portion 3a are so formed that the directions of these two spiral are opposite to each other. Also, the spiral which is formed on the threaded tube 12 and that of the threaded rod 17 are so arranged that the directions of these two spiral are opposite to each other. Furthermore, the pitches of the spiral of the threaded tube 12 and those of the spiral of the threaded portion 3a are selected, by taking into account the relation of the gear ratio between the internal gear 3b and the gear 11a, in such a way that both of these two spiral will have the same pitches after all. In a similar way, the pitches of the spiral of the threaded rod 17 and those of the spiral of the threaded portion 2b are selected so that they will have the identical pitches after all.

Description will hereunder be directed to the function of the embodiment of the present invention.

As the operating ring 5 is rotated, this operating ring 5 will make a forward or backward movement in the direction of the optical axis for a distance which is determined by the pitches of the threaded portions 1a and 2b while rotating jointly with the cylinder 2 and the intermediate cylinder 3, relative to the casing 1. Accordingly, the cylinder 7 which is intended for mounting the objective lens unit A will also make a forward or backward movement in the direction of the optical axis for a distance which is determined by the pitches of the threaded portions 3a and 7a. Also, as the operating ring 5 is rotated, the cylinder 8 will advance or retreat in the direction of the optical axis whilst rotating integrally with said operating ring 5. This movement of the cylinder 8 will cause the cylinder 9—and accordingly the group 10 of auxiliary lenses—to make a forward or backward movement while retaining a certain positional relation relative to the operating ring 5, to thereby effect the progressive or retrogressive alteration of the magnification of the objective lens system which contains the objective lens unit A. The value of the magnification which is set in the manner described above is obtained by reading the magnification indicating graduation 5a at the point directed by the fixed indicator 1c. On the other hand, the rotation of the intermediate cylinder 3 resulting from the rotation of the operating ring 5 will cause the rotation of the gear cylinder 11. In view of the fact, however, that, during such a rotation of the gear cylinder 11, the threaded tube 12 and the threaded rod 17 themselves are both retained in the manner not being able to be rotated, said threaded tube 12 and the threaded rod 17 will peep out of or draw backwardly into the gear cylinder 11 relative to each other as the gear cylinder 11 is rotated. Since the threaded tube 12 is urged by the pressure ring 14 in the counterarrow direction in FIG. 1, and since the threaded rod 17, on the other hand, is held by the casing 1 so as not to be able to move in the counterarrow direction, said gear cylinder 11 will, after all, be compelled to advance or retreat, while rotating, in the direction of the optical axis so that the total length given by the threaded tube 12 plus the threaded rod 17 will be elongated or reduced by an amount which is equal to the distance covered by the forward or backward movement effected by the cylinder 7, i.e. the objective lens unit A. After the completion of the adjustment of magnification of the objective lens system in such manner as described above and then the focusing of the objective lens unit A in the conventional manner, the shutter button (not shown) is depressed. Whereupon, the threaded rod 17 will be pushed in the direction of the arrow which is indicated in FIG. 1 by means of a known interlocking mechanism during the initial triggering motion thereof. As a result, the threaded rod 17, the gear cylinder 11 and the threaded tube 12 will move, as an integral body, in the direction of the optical axis 0. During this movement, the forward end of the threaded tube 12 will push the pressure ring 14 forwardly against the resiliency of the pressure ring 14. This pushing movement will exert a pushing force onto the operating lever 16 which is adapted to actuate the diaphragm means contained in the objective lens unit A. As a result, the aperture which is defined by the diaphragm blades (not shown will be narrowed automatically as the diaphragm blades are shifted of their position in which the aperture of the lens is full open to the position in which a preset desired aperture is obtained. Upon the removal of the pressure which has been imposed on the shutter button after the completion of an exposure, the threaded tube 12 will make a backward movement as it is pushed backwardly by the action of the resilient pressure ring 14. Then, simultaneously as the diaphragm blades are brought back again to their initial position for holding the full open aperture, the gear cylinder 11 and the threaded rod 17 will be brought back again to their initial position.

As will be clearly understood the foregoing description which has been made in connection with this embodiment which is given by way of example, the focal length or the magnification of the objective lens system or a camera, according to the present invention, can be altered continuously by the rotation of the operating ring 5 of the device C and besides, the length of the operating rod means which is intended for actuating the diaphragm means is adapted to expand or reduce in accordance with the movement, in the direction of the optical axis and relative to the cylindrical casing 1, of the cylinder 7 which serves as the mount for the objective lens. As such, according to the present invention, the rear converter of this embodiment can be quite effectively used in single reflex cameras in particular.

I claim:

1. A device for continuously altering the focal length of photographic lenses adapted to be detachably mounted between an objective lens unit and a camera body, comprising:

a cylindrical casing 1 detachably mounted to said camera body;

an operating ring means having an outside threaded portion 2b and an inside threaded portion 3a, said outside threaded portion 2b rotatably screwed into aid cylindrical casing 1;

a first cylinder 7 for mounting said objective lens unit A screwed into said operating ring means so as to be movable only in the direction of the optical axis of said objective lens unit A;

a second cylinder 8 disposed in said first cylinder 7 in concentric relation with said optical axis and integrally coupled to said operating ring means;

a third cylinder 9 mounted in said second cylinder 8 so as to be movable only in the direction of said optical axis by the rotation of said second cylinder 8;

an auxiliary lens group supported relative to said third cylinder 9;

a diaphragm actuating rod means comprising a gear cylinder 11 disposed in the space between said first cylinder 7 and said second cylinder 8 and meshed with said operating ring means;

a threaded tube 12 screwed into said gear cylinder 11 and supported by said first cylinder 7 so as to be movable only in the direction of said optical axis;

a threaded rod 17 screwed into said gear cylinder 11 and supported by said cylindrical casing 1 so as to be movable only in the direction of said optical axis;

a diaphragm operating lever 16 built in said objective lens unit A;

a pressure ring 14 secured to said first cylinder 7 for urging said threaded tube 12 toward said camera body B and also adapted to operate said diaphragm operating lever;

the spiral of said outside threaded portion 2b and that of said inside threaded portion 3a being so formed that the directions of said two spirals are opposite to each other, and the spirals of said threaded tube 12 and said threaded rod 17 being so formed that the directions of said two spirals are opposite to each other, whereby said first cylinder 7 and said threaded tube 12 are moved forwardly or backwardly along said optical axis in the same direction by an equal amount when said operating ring means is rotated.